United States Patent

Bloom et al.

[11] 3,938,398
[45] Feb. 17, 1976

[54] TORQUE-TRANSMITTING DEVICES

[75] Inventors: Joseph Louis Bloom, Droitwich; Harry Simister Bottoms, Solihull, both of England

[73] Assignee: Joseph Lucas (Industries) Limited, Birmingham, England

[22] Filed: July 3, 1974

[21] Appl. No.: 485,454

[30] Foreign Application Priority Data
July 9, 1973 United Kingdom............... 32665/73

[52] U.S. Cl.................. 74/63; 64/9 R; 403/359; 74/409; 74/441
[51] Int. Cl.² ......................................... F16H 21/12
[58] Field of Search .......... 74/63, 409, 440; 64/9 R; 403/359

[56] References Cited
UNITED STATES PATENTS
1,707,353  4/1929  Fraser............................ 403/359
3,380,097  4/1968  Pharris........................... 403/359

Primary Examiner—Samuel Scott
Assistant Examiner—Wesley S. Ratliff, Jr.
Attorney, Agent, or Firm—Holman & Stern

[57] ABSTRACT

A torque transmitting devices has an input shaft having two axially-spaced sets of external splines. Two internally splined members are threadedly interengaged and respectively engage the spline sets on the shaft. The angular positions of the members are adjusted by spacers so that the portion of the shaft between its spline sets is in torsion, the direction of the torsion being such as to increase the threaded engagement between the members.

5 Claims, 1 Drawing Figure

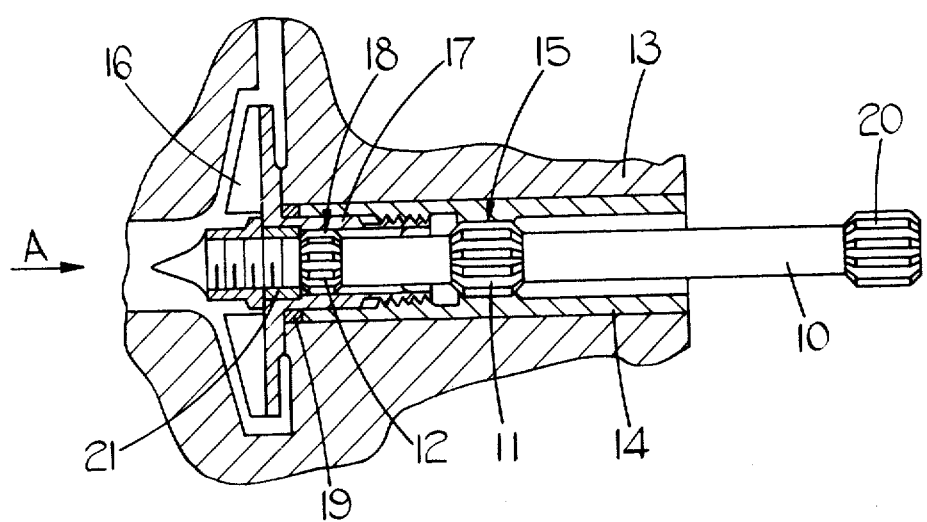

TORQUE-TRANSMITTING DEVICES

This invention relates to torque-transmitting devices.

According to the invention a torque transmitting device comprises a shaft having two axially-spaced sets of external splines, a first member surrounding said shaft and formed with internal splines for engagement with one of said sets of external splines and surrounding said shaft, said second member being formed with internal splines engaged with the other of said sets of external splines, and means for adjusting the relative angular positions, about the axis of said shaft, of said first and second members so that the portion of said shaft between said sets of splines is subjected to torsional stress in a sense to increase the threaded engagement between said first and second members.

An example of the invention will now be described with reference to the accompanying drawing which shows, diagrammatically, a section through part of a centrifugal pump, incorporating a torque transmitting device according to the invention.

A shaft 10 is formed with two axially spaced sets 11, 12 of external splines. The set 11 contains nine splines and the set 12 contains eight splines. Rotatably mounted within a body 13 of the pump is a sleeve member 14 through which shaft 10 extends. Sleeve member 14 is provided with internal splines 15 complementary to the splines in the set 11.

An impeller arrangement 16 for the pump has an integral hollow portion 17 which extends within member 14 and threadedly engages the latter member 14 and portion 17 having conventional right-hand threads. Portion 17 is provided with internal splines 18 complementary to the splines in the set 12. The axial length of the splines 18 is substantially greater than that of the spline set 12, such that splines 12, 18 may be fully interengaged while spline set 11 is still clear of internal splines 15. A spacer 19 is engaged between the opposing end faces of the impeller arrangement 16 and the sleeve member 14. The spacer 19 is interchangeable with other spacers, or combinations of spacers, of varying total thicknesses, whereby, when the impeller arrangement 16 is tightened into position on the member 14, these two parts may be set to a desired relative angular position, thus giving a desired torsion to shaft 10.

The shaft 10 includes a further set 20 of splines by means of which a drive may be applied to the pump.

On assembly the impeller arrangement 16 is assembled on to the sleeve member 14, the spacer, or spacers 19 being selected so that the position of shaft 10 to engage the splines 18 is approximately 1° anticlockwise, viewed on arrow A, of the shaft position in which splines 11, 15 can be interengaged. Shaft 10 is inserted to engage spline set 12 with the ends of the splines 18 adjacent splines 15. Impeller arrangement 16 is held stationary and shaft 10 twisted, by means of splines 20, in a clockwise direction (viewed on arrow A) until spline set 11 can be engaged in splines 15. The shaft 10 is then pushed home until splines 11, 15 are fully interengaged, in which position splines 12 abut a collar 21 secured to the impeller arrangement 16. The resulting torsional strain in the portion of shaft 10 between spline sets 11 and 12 serves to urge portion 17 clockwise with respect to sleeve 14 and thus to maintain the impeller arrangement in position, screwed down against the spacer 19.

Shaft 10 has a threaded end 22 which projects beyond impeller arrangement 16 and is engaged by a stiffnut 23 to maintain the shaft in its proper axial position.

In use impeller assembly 16 and sleeve member 14 rotate together, shaft 10 acting as an input member. It will be appreciated that in other applications of the transmission device, an output drive could be taken from either the sleeve member 14 or the portion 17. In a further alternative, either the sleeve member 14 or portion 17 could provide an input member, and an output drive taken from the shaft 10.

The arrangement permits axial misalignment between the shaft 10 and the remainder of the device, without backlash which might result in wear.

We claim:

1. A torque-transmitting device, comprising a shaft having two axially-spaced sets of external splines, a first member surrounding said shaft and formed with internal splines for engagement with one of said sets of external splines, a second member threadedly engaged with said first member and surrounding said shaft, said second member being formed with internal splines engaged with the other of said sets of external splines, and means for adjusting the relative angular positions, about the axis of said shaft, of said first and second members so that the portion of said shaft between said sets of splines is subjected to torsional stress in a sense tending to increase the threaded engagement between said first and second members.

2. A device as claimed in claim 1 in which said first and second members has respective oppositely-facing abutment faces, and said means for adjusting said relative angular positions comprises a spacer engaged between said faces.

3. A device as claimed in claim 1 in which the axial length of the splines on said second member is greater than that of the other of said sets of external splines, and the axial spacing between the splines on said first and second members is such that said other set of splines may be engaged with the splines on said second member prior to engagement between said one set of splines and said first member.

4. A device as claimed in claim 1 which includes means engaging said shaft and said second member for preventing axial movement of said shaft relative to said members.

5. A device as claimed in claim 1 in which one of said members forms part of an impeller for a centrifugal pump.

* * * * *